United States Patent
Maples et al.

[19]

[11] Patent Number: 6,167,433
[45] Date of Patent: Dec. 26, 2000

[54] SHARED MULTI-USER INTERFACE FOR MULTI-DIMENSIONAL SYNTHETIC ENVIRONMENTS

[75] Inventors: Creve Maples; Craig A. Peterson, both of Albuquerque, N. Mex.

[73] Assignee: Muse Technologies, Inc., Albuquerque, N. Mex.

[21] Appl. No.: 09/126,742

[22] Filed: Jul. 31, 1998

Related U.S. Application Data

[60] Provisional application No. 60/054,577, Aug. 1, 1997.

[51] Int. Cl.[7] ................................................. G06F 13/00
[52] U.S. Cl. ............................................................ 709/204
[58] Field of Search .................................... 345/329, 330, 345/331, 332, 333; 709/200, 201, 204, 205, 212, 213, 216, 217, 218

[56] References Cited

U.S. PATENT DOCUMENTS

| | | | |
|---|---|---|---|
| 4,974,173 | 11/1990 | Stefik et al. | 345/331 |
| 5,107,443 | 4/1992 | Smith et al. | 345/331 |
| 5,319,777 | 6/1994 | Perez | 707/10 |
| 5,680,524 | 10/1997 | Maples et al. | 345/427 |

OTHER PUBLICATIONS

Maples C et al.: "mu uSE (Multidimensional, user–oriented synthetic environment): a functionality–based, human–computer interface" International Journal of Virtual Reality Winter 1995, USA, vol. 1, No. 1, pp. 2–9.

Smith G. et al.: "SOL: A Shared Object Toolkit for Cooperative Interfaces" International Journal of Human–Computer Studies, Feb. 1995, UK, vol. 42, No. 2, pp. 207–234.

*Primary Examiner*—Robert B. Harrell

[57] ABSTRACT

The shared multi-user communication system allows a group of users to explore, navigate, manipulate and examine application data in a multi-dimensional synthetic environment. A shared user state and parameter table storing the attributes of the data being examined at each synthetic environment system within the group is stored locally at each synthetic environment system. A shared control table defines which parameters of the data locally examined are to be controlled by the local user and which attributes are to be controlled by a remote synthetic environment system. Thus, data may be examined at the local station fully independent from the examination of data at remote stations. Alternatively, the data examined at the local station may be partially or wholly synchronized to the examination of data at remote stations. An override table is further provided to enable data being examined at the local station to be maintained privately and not transmitted to the remote synthetic environment systems of the group. For security purposes, a group establishment protocol prevents a group from being established without every group member approving every member's membership in the group.

23 Claims, 9 Drawing Sheets

SHARED MULTI-USER INTERFACE FOR MULTI-DIMENSIONAL SYNTHETIC ENVIRONMENTS

The present application claims the benefit under 35 U.S.C. § 119 based upon Provisional Application Ser. No. 60/054,577 filed on Aug. 1, 1997 and entitled "Shared Multi-User Interface for Multi-Dimensional Synthetic Environments."

FIELD OF THE INVENTION

The present application is generally directed to a shared, multi-user interface allowing multi users, which may be spatially distributed, to interact with a single data application. More particularly, the present application is directed to a shared, multi-user interface for sharing information in a multi-dimensional synthetic environment (often known as a "virtual reality" environment) to improve multi-user manipulation and perception of data in such an environment.

BACKGROUND OF THE INVENTION

From the dawn of time, people working effectively together have been able to accomplish seemingly impossible objectives, from designing and building the great pyramids of Egypt, to eradicating smallpox, to walking on the moon. Today, in the information age, the amount of information available for analysis and application to various problems is increasing at unparalleled rates. Recognizing this problem, the inventors of the present application have previously developed a synthetic multi-dimensional user oriented environment (hereinafter "MUSE"). The multi-dimensional synthetic environment developed by the inventors of the present application is described in U.S. Pat. No. 5,680,524 entitled "Synthetic Environment Employing a Craft for Providing User Perspective Reference" the inventors of the present application, which is hereby incorporated by reference into the present application.

The multi-dimensional synthetic user environment disclosed in the above-mentioned patent provides a software framework for N-user application development. This system is intended to simplify the flexible manipulation of data, information, or programs by a user. The multi-dimensional system described in this patent facilitates the development of application programs independent of system platform, including the specific computer and peripherals utilized to run the multi-dimensional synthetic environment system and the application program run used by the system. Thus, the multi-dimensional synthetic environment of this prior patent enables a user to employ any peripheral devices on any multiprocessing platform to interact with the application. A programmer may modify the multi-dimensional synthetic environment by adding drivers to support a new joystick, or other input or output device.

According to the teachings of the above patent, application development may be performed without consideration of the specific platform running the multi-dimensional synthetic environment system, the application development being concerned primarily with the tasks of data gathering, data preparation and presentation and user response.

The multi-dimensional synthetic environment system mentioned in the above patent is directed to the goal of enhancing the link between the computer and the human. The intent of this system is to increase the effective rate of a user's information absorption through the use of precognitive or subcognitive capabilities of the human mind. By flexibly supplying information to the user in accordance with the teachings of the multi-dimensional synthetic environment of the above-mentioned patent, pattern recognition and trend analysis functions of the human mind may be more efficiently utilized, rendering leaps of insight more likely.

The multi-dimensional synthetic environment system described in the above-mentioned patent is designed to provide real time, multi-sensory data input and system response enabling humans to better interact with an information environment. The multi-dimensional synthetic system of the above-mentioned patent is designed to enhance human exploration, navigation, manipulation and examination of the information environment. The multi-dimensional synthetic operating system described in the above-mentioned patent enables the user to manipulate the data provided in the application program by asking questions and directing the application to perform more easily achieved tasks, leaving more complex pattern recognition and trend analysis for the operator.

SUMMARY AND OBJECTS OF THE INVENTION

While U.S. Pat. No. 5,680,524 describes the system for performing the above-mentioned functions, this system was a single user system. As already mentioned, in complex human endeavors, it is highly desirable for a number of people to work together to accomplish desired objectives. In today's world it is often the case that the individuals working on an individual project are geographically distributed and have different equipment and different expertise. The shared multi-user interface of the present application allows plural users to work together in a multi-dimensional synthetic environment to enable collective effort of multiple users while simultaneously exploring individual creativity and independence.

The interface of the present application allows plural individuals at remote locations to simultaneously exploit an information environment, and in particular, a shared, real time, multi-media and multi-sensory environment over substantially any communication network. While the principals of the present application are intended for the sharing of multi-dimensional environments and their associated data, the principals of the present application are also applicable for any desired form of data sharing between plural users. The shared multi-user interface of the present application creates personal and private work space for every participant in the group and permits each user to freely work with their own data and tools, either by themselves or in groups of any desired size.

The shared multi-user interface of the present application promotes a fully immersed synthetic environment with sound, speech and voice recognition to automatically connect users in remote locations, regardless of the hardware employed by each user. Platform and device independence were key features of the multi-dimensional synthetic environment described in the above-mentioned patent. Platform and device independence are also key features of the shared multi-user interface enabling communication between plural users within a information platform such as a multi-dimensional synthetic environment.

In business, for example, the functionality of meetings may be radically altered, as executives from different locales come together in virtual space, each working with his or her own MUSE system using the shared multi-user interface of the present application to access and display both shared information and proprietary data available only locally. Participants in such a meeting have instant access to their own electronic files, audio and visual representations, or any other type of material to compare notes and greatly speed the decision-making process. Any such data or information may be shared with other attendees of the meeting, as locally desired.

In today's real world environment, team members often have diverse background and experience, bringing this background and experience to a problem-solving team. In the shared multi-user system of the present application, team members may go off and work on their own, and come back to report to the shared group at any desired time. Thus, multiple members of the shared group may explore ideas and gather information individually and in parallel, and subsequently share this information as desired, in real time.

It is accordingly apparent that there is a need for a system to allow effective collaboration within a multi-dimensional synthetic environment but which allows each user of the shared environment to develop ideas and analyze data independently, selectively sharing the relevant information with the shared group. The system of the present application allows virtually any form of data synchronization, as needed to meet these goals. Thus, each user of the shared environment may synchronize one or more aspects of the local environment to one or more users of the multi-user group, as desired to better collaborate and understand the information in the multi-user environment.

In order to accomplish the above-mentioned general objectives, it is desirable for each MUSE system in the multi-user group to be aware of the control states and parameters of each other MUSE system in the shared group. Thus, to accomplish the above objectives, the system of the present application employs a state and parameter table representative of the states and parameters of every MUSE system in the shared group, at each station within the group. Thus, each time a user locally requires an application or process which is controlled by states or events triggered by local actions produced by the user of the local MUSE system, updated state table and control parameters are constructed for storage locally, and transmission to each MUSE system within the multi-user shared group.

In order to allow selective synchronization of a local $\mu$uSE system with one or more remote MUSE systems within the shared multi-user group, a shared control table is provided which indicates control assignment of each functional aspect of the MUSE system to either the local user or another user within the multi-user shared group. Thus, selective synchronization of virtually any or all aspects of the local application to the control actions of one or more other users of the shared multi-user group is possible in accordance with the shared multi-user environment system of the present application.

The present application further allows a user to select virtually any state or parameter of the local system as private, inhibiting the transmission of that state or parameter to another MUSE system within the shared multi-user group. This is accomplished by the use of an override table which inhibits the transmission of developed states or parameters under local user control. This allows information to be maintained privately at the local station, as desired by the local user.

The present application also addresses the issue of security in establishing multi-user shared groups in accordance with the teachings of the present application. Each station of the present application includes potential shared user address particulars. When a user requests log-on to a shared group, the user transmits user address particulars to each station within the shared group which verifies that this information is locally stored as an authorized user address. Each user of a shared group has the opportunity to authorize or "black ball" any proposed new user. If each user in the present group agrees to the addition of the new user, the MUSE systems already in the group will call back the proposed new user to establish communication.

The system of the present application may be desirably used with any communication system, at any level of desired encryption and decryption. Accordingly, confidential information transmitted between MUSE systems within the shared multi-user group may be maintained secure.

It is accordingly an object of the present invention to provide a shared, multi-user interface providing unparalleled freedom, enabling multiple users, which may have different expertise, to work together from geographically diverse, shared, real time, multi-media and multi-sensory environments.

It is a further object to accomplish this function over any desired network such as a computer internet, telephone lines, or the like.

It is a further object to allow multiple users in a multi-dimensional synthetic environment to utilize both personal and private work spaces, permitting each user to freely work with their own data and tools, and share this data and these tools with other desired users of the system.

It is another object of the present invention to provide a shared, multi-user interface providing a fully immersive synthetic or virtual reality environment with sound, speech and voice recognition which may be selectively shared by the multi-users of the system.

It is another object of the shared multi-user interface of the present application to allow users to selectively synchronize their environments with the environments of other users and to teleport, or instantly relocate, from one place to another within the synthetic environment, allowing viewing the environment from the perspective of another user, thereby enabling comparison and discussion of the environment being viewed by multiple users.

It is still another object of the shared multi-user interface of the present application to allow users within an established group to approve or "black ball" each proposed new user to the group and to further verify that the proposed new user is an authorized-user.

It is a still further object of the present application to allow selective synchronization of virtually any function within the local environment to be selectively synchronized to any one of the other user environments within the shared group.

It is a still further object of the present invention to selectively identify one or more functions, parameters, or data as private, inhibiting the transmission of the functional parameters and data to the other systems in the group.

These and other objects of the present invention will become more fully understood by reference to the attached drawings and the following detailed description which are exemplary of the invention recited in the appended claims and which form one embodiment of the present application.

BRIEF DESCRIPTION OF THE DRAWINGS

The present application may be more fully understood from the drawings appended hereto and the following description of the preferred embodiments.

FIG. 11 is an example of the local authorized user file 744 employed by the proprietor of FIG. 6 and its local user log-in request instigator 700 and remote request handler 800.

DETAILED DESCRIPTION OF PREFERRED EMBODIMENTS

Figure 1:
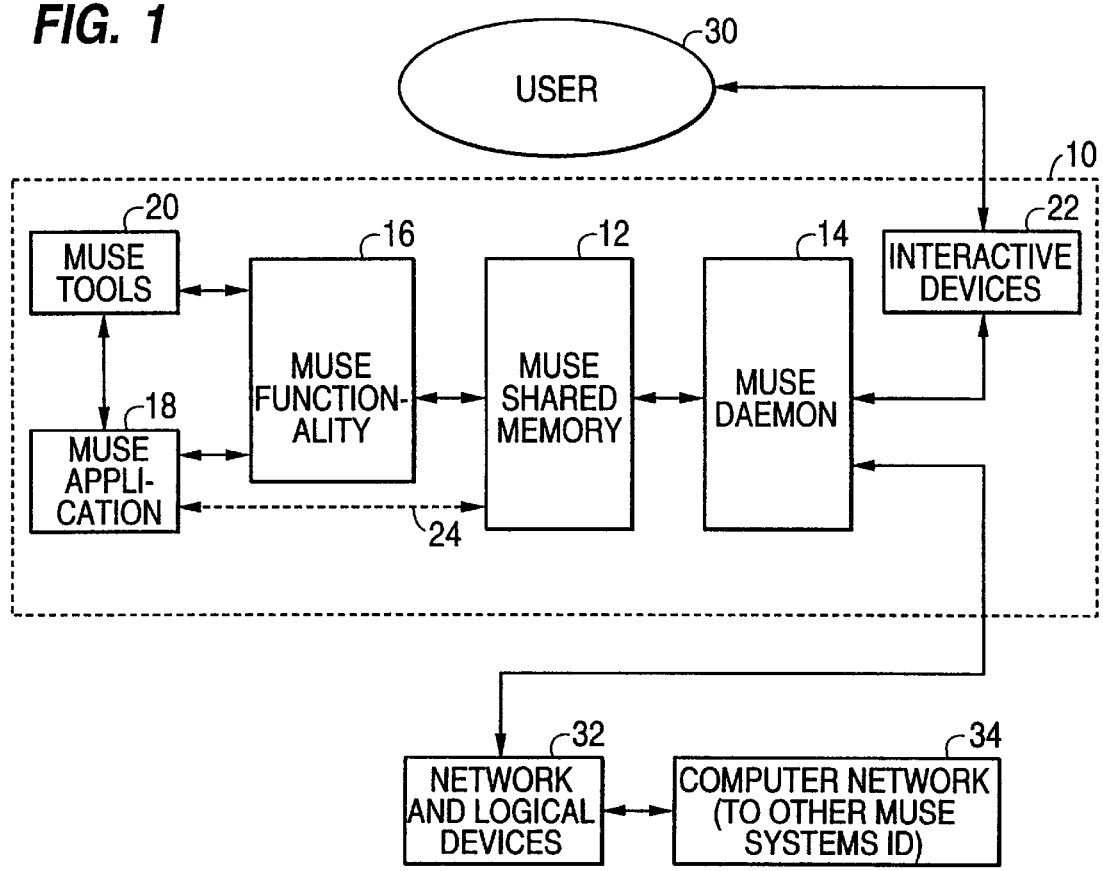
FIG. 1 illustrates a multi-dimensional synthetic environment system such as that disclosed in U.S. Pat. No. 5,680, 524 and its manner of interface with other multi-dimensional synthetic environment systems according to the teachings of the present application.

FIG. 1 illustrates the multi-dimensional synthetic environment system of U.S. Pat. No. 5,680,524 and its interface with other computers in accordance with the teachings of the present application. Because the invention of the present application is generally directed to the interface of synthetic environment systems used by multiple users in a shared group, each user within a shared group will typically employ a multi-dimensional synthetic environment of the type described in the aforementioned patent. Consequently in describing the multi-user interface of the present application, employing plural MUSE systems 10, there is a danger of confusion between these multiple MUSE systems 10. Consequently, in the present description, the "local" multi-dimensional user-oriented synthetic environment of MUSE system 10 will always refer to the environment having the program functionality then being explained. Remote multi-user synthetic environments will be those synthetic environment systems 10A, 10B, 10N of FIG. 2 which communicate with the local multi-dimensional user-oriented synthetic environment system 10. Thus, in the description of the present application, the functionality will be described for the local multi-dimensional user oriented synthetic environment or MUSE system 10 which will interact with one or more remote MUSE system 10A, 10B, 10N.

The local multi-dimensional synthetic environment or MUSE system 10 may be implemented with virtually any general purpose digital computer having multi-processing capabilities and virtually any input and output devices as taught in the aforementioned patent. The multi-dimensional synthetic environment system 10 employs a shared memory to interact between the user 30 and a selected synthetic environment application 18.

A user 30 interacts with the multi-dimensional synthetic environment system 10 using one or more interactive input or output devices 22 which may be freely selected to enable exploration, navigation, manipulation and examination using the multi-dimensional synthetic environment system. The interactive devices 22 communicate with a shared memory 12 through the system daemon 14 which, in accordance with the teachings of the present application, is also in communication with the MUSE systems 10A to 10N of one or more remote users to make plural multi-dimensional synthetic environment systems 10 into a truly shared system.

The system daemon 14 supplies device nonspecific commands to the system functionality 16 via the shared memory 12 and further, obtains output information from the system functionality 16 through the shared memory 12 for supply to the user using suitable output devices 22, for example, stereoscopic goggles, sound generators, tactile feedback, or the like. The system functionality 16 interfaces the multi-dimensional synthetic environmental system 10 with a system application 18 which is written to be compatible with the standardized system functionality 16 and the system tools 20. The system functionality 16 accesses the system application 18 in standardized ways and obtains outputs from the system functionality 18, as needed, for supply to the shared memory 12. The dashed connection 24 between the system application 18 and the shared memory 12 is normally not utilized by the system application 18. However, the multi-dimensional synthetic environment system 10 enables such direct access to shared memory 12 by the system application 18, as may be necessary to implement specific functionality as would occur to the application designer.

As thus far described, the multi-dimensional synthetic environment system 10 is generally disclosed in the aforementioned U.S. Pat. No. 5,680,524. However, this multi-dimensional synthetic environment system 10 as disclosed in this patent is capable of supporting only a single user at a single location.

In accordance with the teachings of the present application as described in FIG. 1, the system daemon 14 is modified and supports connection to network and/or logical devices 32 which enable the communication of information between the local multi-dimensional synthetic environment system 10 and N remote MUSE systems 10A–10N where N is at least one computer using known networking or communication techniques using including network communication hardware 34S.

Figure 2:
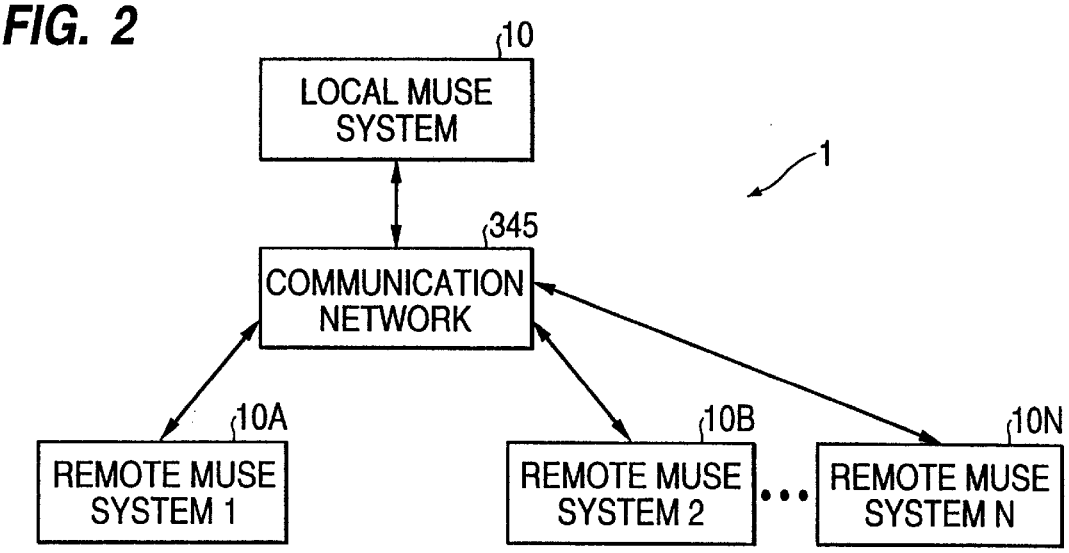
FIG. 2 illustrates plural multi-dimensional user synthetic environment (MUSE) systems being connected in a shared group according to the teachings of the present application.

FIG. 2 illustrates the connection of the local multi-dimensional synthetic environment system 10 and N other remote multi-dimensional synthetic environment systems 10A, 10B, 10N where N is one or more to form a multi-user shared group 1. FIG. 2 illustrates the connection of a local MUSE system 10, Remote MUSE system 1, 10A, Remote MUSE system 2, 10B and Remote MUSE system N, 10N using any desired network communication hardward 34S. In the preferred embodiment of the present invention, this network communication hardware may be a computer intranet, an internet communication link, dedicated telephone lines, or any transmission technique for digital and computer data between multiple computers as would occur to one of ordinary skill in the art. Although not necessary, in accordance with the teachings of the present application, such network communication hardware 34S may desirably have a suitable degree of privacy and encryption to render the multi-user shared group 1 of multi-dimensional synthetic environment systems 10, 10A, 10B and 10N resistant to access and tampering by unauthorized personnel.

The hierarchically organized shared memory 12 is the heart of the multi-dimensional synthetic environment system. It allows the multi-dimensional synthetic environment system 10 and system application 18 to asynchronously access data attributes stored in the shared memory 12 and utilized by the rest of the system. The MUSE daemon 14 is responsible for translating and controlling hardware and logic devices. The MUSE application 18, aided by the MUSE functionality 16 performs desired synthetic environment data manipulation.

THE MUSE APPLICATION

Figure 3:
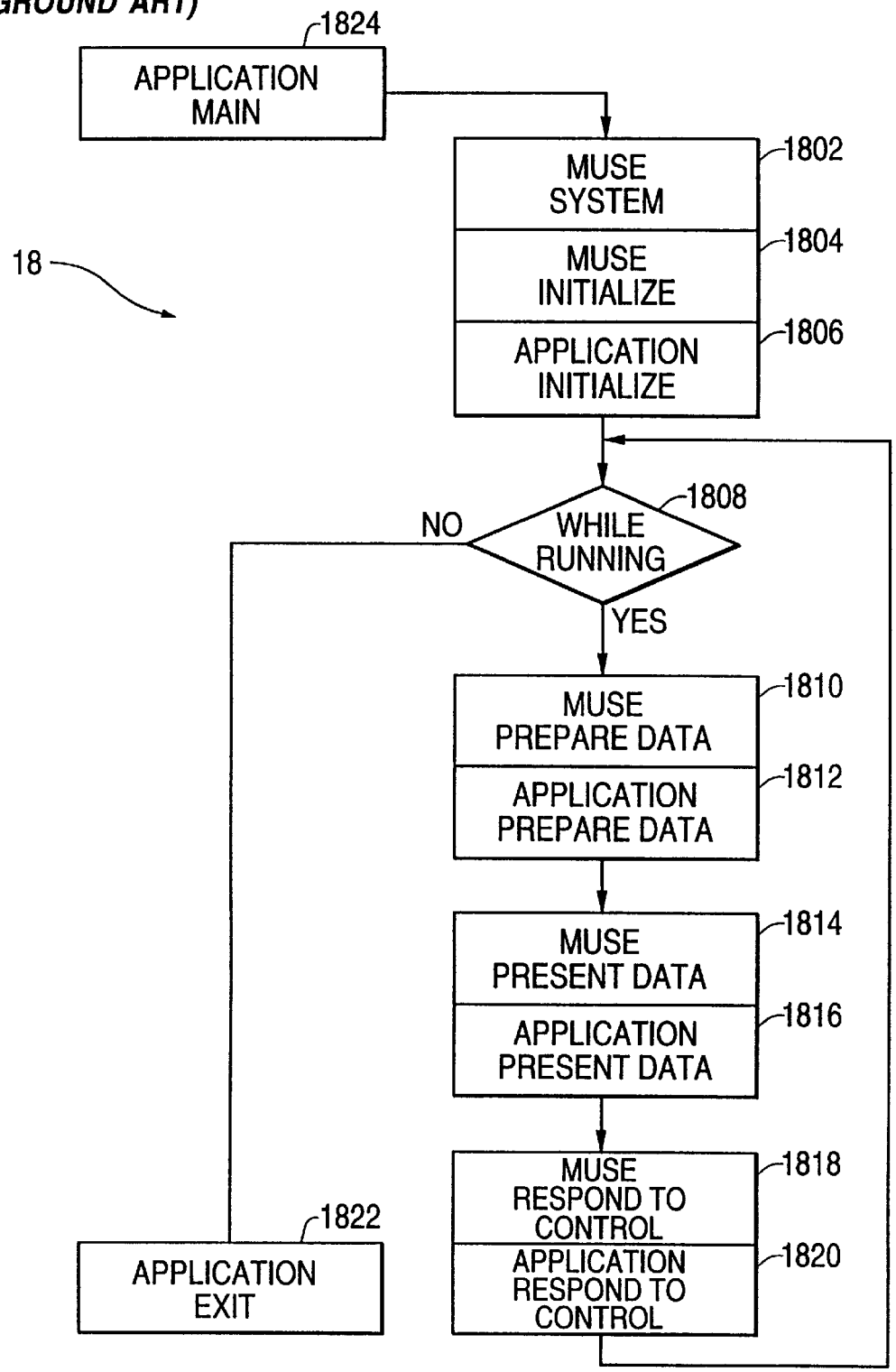
FIG. 3 is a description of the multi-dimensional synthetic environment application control of the type employed in the aforementioned U.S. patent.

The MUSE application 18 is organized in accordance with the flow chart of FIG. 3. Once again, the MUSE application 18 of FIG. 3 is a part of the MUSE system described in U.S. Pat. No. 5,680,524 issued Oct. 21, 1997 and accordingly, this figure has been labeled "Background Art". The MUSE application of FIG. 3 calls the MUSE system, allowing the MUSE functionality 16 and MUSE daemon 14 to initialize the MUSE multi-dimensional synthetic environment system 10. The main routine of the MUSE application 1824 contains application specific functionality which is written to run on the MUSE system 10 and is independent of the specific computer platform and interactive devices used in any MUSE system 10. Thus, the MUSE system 10 can support any and all applications, models, or data designed to run on the MUSE system. Thus, the application main program 1824 interfaces with the MUSE system 10 in accordance with a standard interface protocol.

At step 1802, the MUSE system 10 which is substantially the entirety of the multi-dimensional synthetic environment system 10, including the MUSE daemon 14 and MUSE functionality 16, is called. At step 1814, the MUSE system including the $\mu$uSE daemon 14 and MUSE functionality 16 is initialized and further initializes the shared memory 12. Any necessary MUSE tools 20 are also initialized. The application main program 1824 is then accessed at step 1806 to initialize the application program's resident functionality. The application 18 is expected to initialize data, its own graphics particulars, and to direct MUSE to perform application specific behavior.

Figure 10:
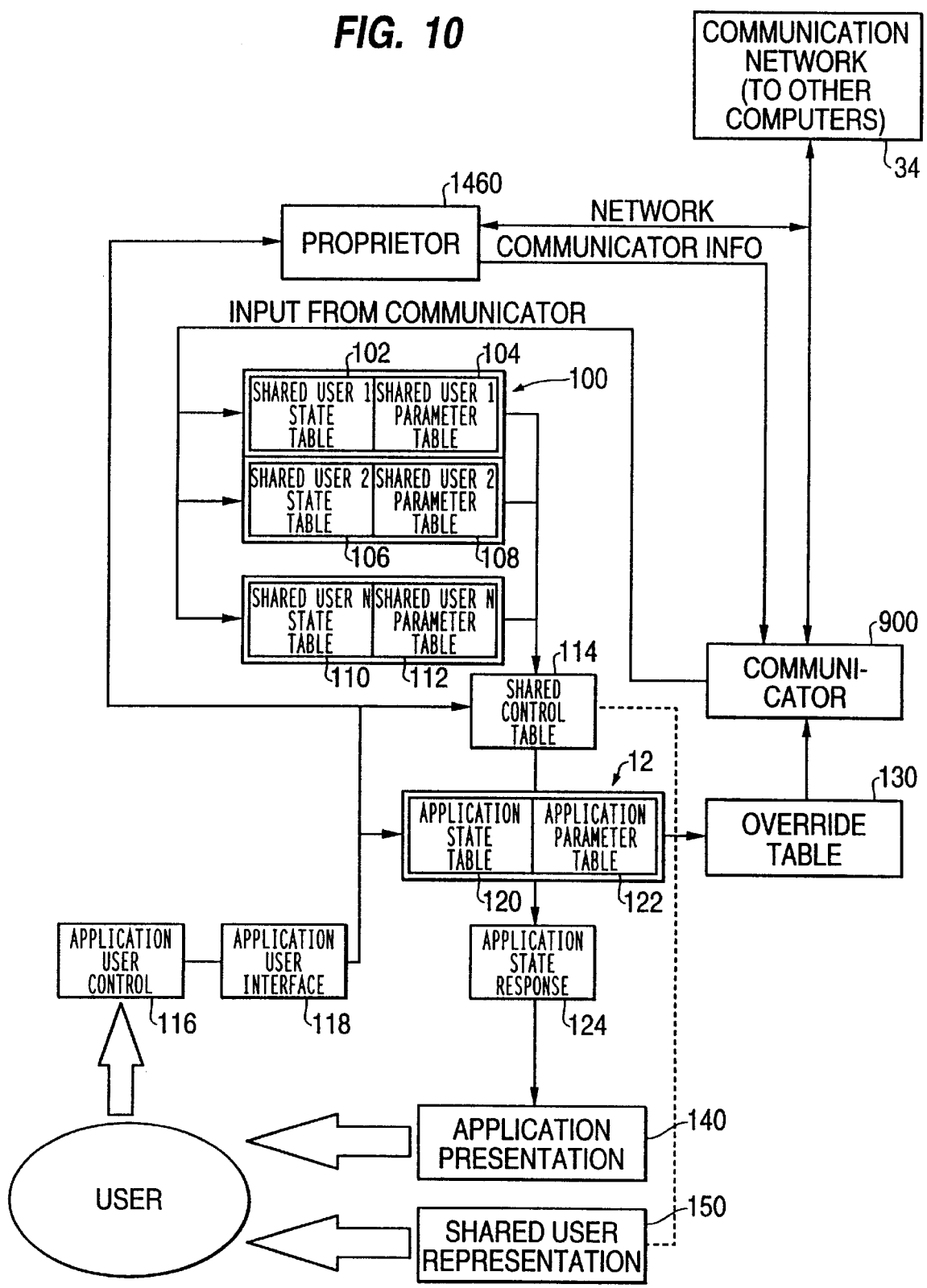
FIG. 10 is a schematic diagram illustrating the use of shared user state and parameter table information 100 to facilitate selective synchronization and selective privacy according to the teachings of the present application.

The application control routine of FIG. 3 then begins to prepare data at step 1810 for presentation by storing a state and parameter table in shared memory 12 such as is illustrated in FIG. 10. The MUSE system prepares these state and parameter tables 120, 122 which are a representation of all control states and parameters needed to control the application 18, while responding to the user by manipulating the states and control values in the state and parameter table until execution is completed. The state and parameter tables 120,122 contain each control state and parameter of the local MUSE system 10. Parameters may include information identifying objects within the virtual environment, while state information may include the orientation of the object, its translation in space, or any other necessary control state to accomplish the desired functionality of the application 18 or the MUSE system 10.

At step 1812, the application initializes or prepares its own data. At step 1814 and 1816, both the MUSE system and the application present data to the user using the state and control tables 120,122. At step 1818 and 1820, the MUSE system and the application system respond to the user's control request which are stored in the MUSE shared memory 12 as an application control state and parameter set. The process of preparing and presenting data and responding to control is iterated so long as the application is running. If the application is not running, the application branches at step 1808 to the application exit 1820. It should be noted that the MUSE application provides basic environment parameters and callback entry points to enable data gathering, readying, presenting and response routines to use the application data, model, or program.

MUSE DEVICES

Figure 4:
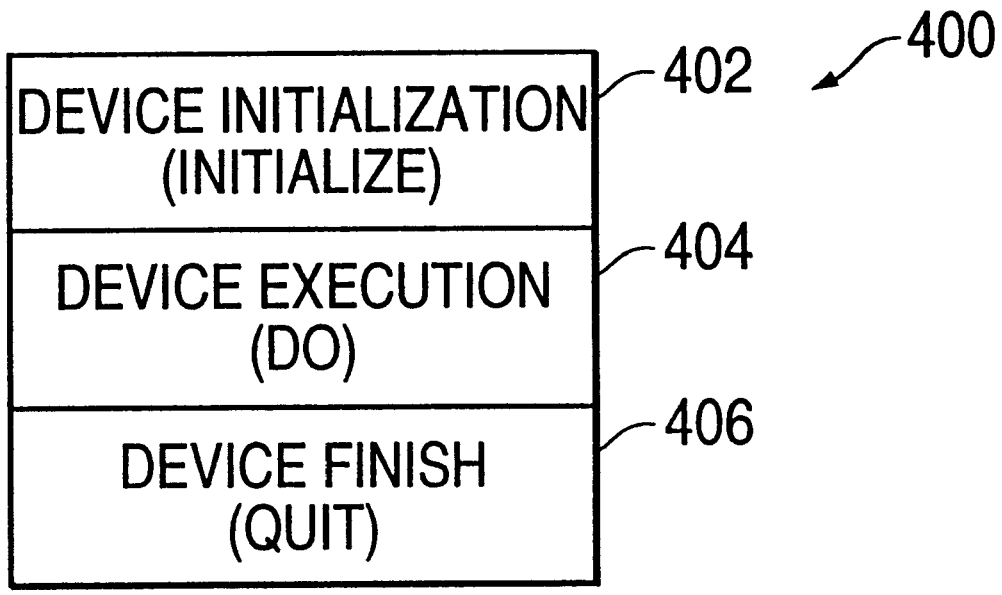
FIG. 4 is a flow chart showing a device driver 400 of the type utilized in the system of the aforementioned U.S. patent.

As already mentioned, the MUSE system 10 may interact with any output device 22 and is thus suitable for use on a variety of hardware and software platforms. The MUSE daemon 14 interacts with a device driver 402 having the general structure illustrated in FIG. 4 and interfacing with the interactive devices 22. Each device driver 400 includes a device initialization section 402, a device execution section 404, and a device finish section 406. A device routine illustrated in FIG. 4 is associated with each device 22 and is first called to initialize the device driven, possibly opening lines of communication or memory allocation for run time execution at step 402. Then, at step 404, the device is called to perform execution tasks repeatedly until the environment has completed execution of what may involve polling, calculation, or communication, depending upon the specific device. When the environment has completed use of the device 22, the device driver is called to finish execution by performing cleanup tasks at step 406.

MUSE DAEMON

Figure 5:
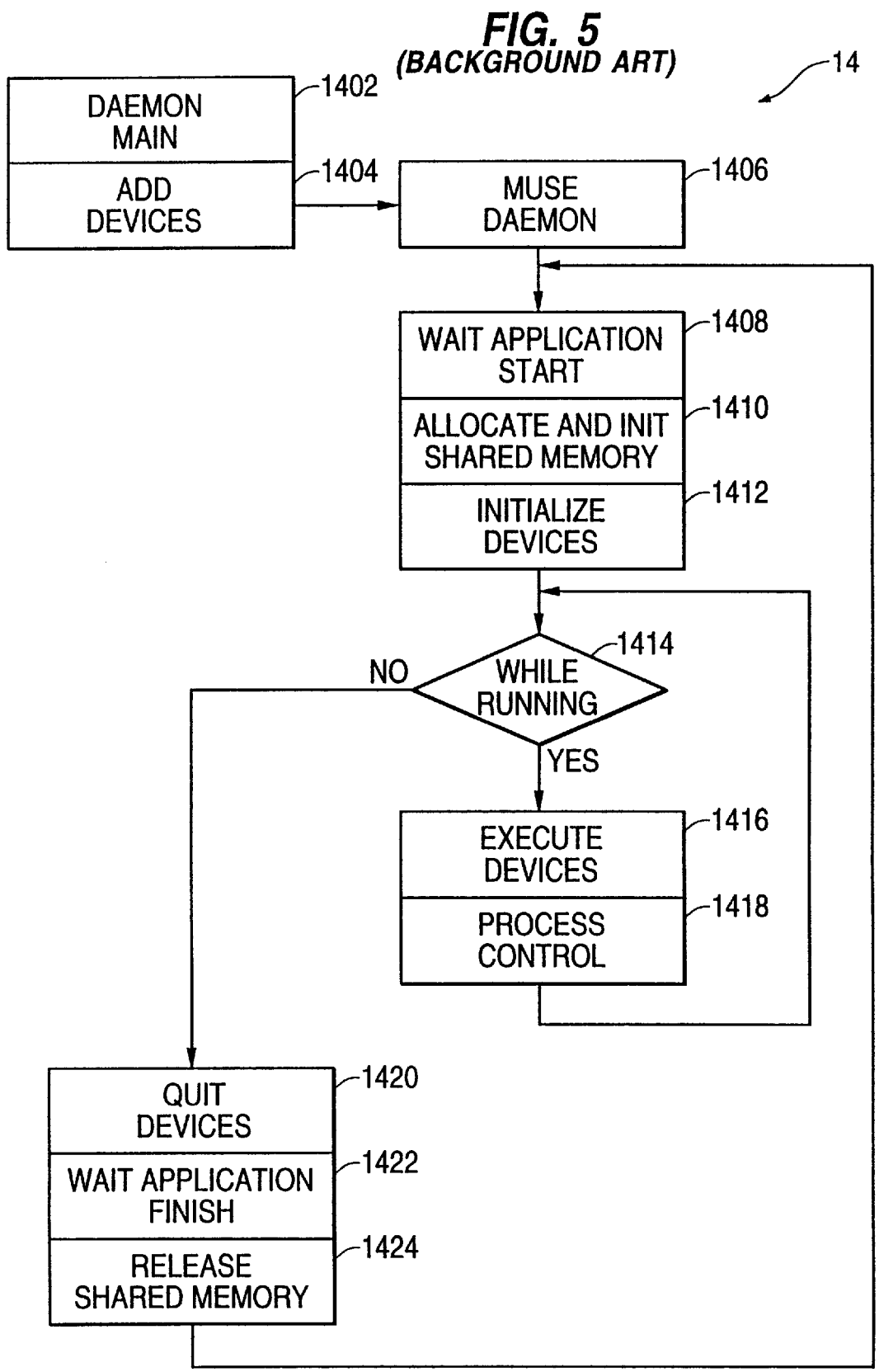
FIG. 5 illustrates a flow chart of the MUSE daemon program of the type used by the aforementioned U.S. patent.

The MUSE daemon of FIG. 5 is part of the MUSE system described above with reference to U.S. Pat. No. 5,680,524 and is responsible for handling execution of devices (each controlled by a device driver 400), whether they be physical devices such as joysticks or logical devices such as numerical processes. As will be described further in this application, the communication techniques according to the teachings of the present application are treated by the MUSE daemon as a device 22. The MUSE system gains substantial advantage by using separate processes for the application 18 and the daemon 14 and the asynchronous access of information to/from the shared memory 12 by both application 18 and daemon 14.

FIG. 5 illustrates a flow chart of the MUSE daemon 14. The MUSE daemon 14 can interact with any device 22, through the use of a device driver 400 as illustrated in FIG. 4. A new driver 400 may easily be added for a new interactive device 22 as is needed. The MUSE daemon routine 14 of FIG. 5 performs overall organizational control of devices and their interaction with the MUSE shared memory. The daemon 14 performs shared memory allocation within the shared memory 12.

At step 1402, the daemon main program is enabled. The daemon program then adds devices 22 as needed at step 1404, calling their device drivers 400. At step 1406, the MUSE daemon 14 goes active, performing daemon initialization tasks. At step 1408, the MUSE daemon awaits the start of the MUSE application 18. Upon completion of application initialization as illustrated in FIG. 3 at step 1806, the MUSE daemon of FIG. 5 allocates and initializes the shared memory 12 at step 1410.

After allocation and initialization of the shared memory 12 in step 1410, the MUSE daemon of FIG. 5 initializes each device 22 at step 1412, causing each device driver to perform step 402 of FIG. 4. Once the MUSE daemon determines that initialization of each device driver 400 is complete, the MUSE daemon determines whether the daemon has been called and is therefore running at step 1414. Assuming the daemon 14 is running, the daemon 14 then proceeds to step 1416 where the daemon executes each device driver 400 sequentially, performing the step 404 of each device driver as illustrated in FIG. 4 and then, at step 1418, performs daemon process control tasks such as timing to make the run rates of the system consistent, and ensuring that all processes are performed as necessary.

At step 1414, the system again determines whether the daemon 14 is running. Unless a quit signal is received from the application routine 18 of FIG. 3, the MUSE daemon 14 continues to execute devices 22 and perform necessary process controls at steps 416 and 418 until step 1414 determines that the daemon 14 is no longer being called and has received a quit signal.

Upon receipt of a quit signal from the application program 18 of FIG. 3, the daemon 14 controls finishing tasks performed by the device driver 400 embedded within the system at step 1420. This step performs the steps 406 of each of the device drivers of FIG. 4. Subsequently, at step 1422, the MUSE daemon 14 awaits completion of the application program 18 of FIG. 3. Once the application program 2 has been completed at step 1822, the MUSE daemon 14 releases shared memory at step 1424 and returns to wait the start of a new application program 18.

MULTI-USER SHARED USE OF THE MULTI-DIMENSIONAL SYNTHETIC ENVIRONMENT SYSTEM

"Application" as the term is used herein, refused to the multi-dimensional synthetic environment application, data or models 18, which are operated based upon the MUSE system 10 and its protocols. The use of such a synthetic environment in a shared manner, as illustrated in FIG. 2, is facilitated by at least four features developed by the inventors and described herein. These four concepts gradually corresponds to 1) the need to log into the shared environment, 2) the need to securely communicate system control state and information, as well as application state and information within the shared environment (collectively referred to as "shared information"), 3) to synchronize and desynchronize selected aspects or functions of application execution and presentation, as desired, and 4) to perform these functions in a time efficient manner considering the bandwidth of the communication channel separating the local and remote MUSE multi-dimensional synthetic environment systems 10–10B as illustrated in FIG. 2.

The multi-user, shared environment according to the teachings of the present application, will now be described with reference to FIGS. 6–9.

THE MULTI-USER SHARED INTERFACE PROPRIETOR

Figure 6:
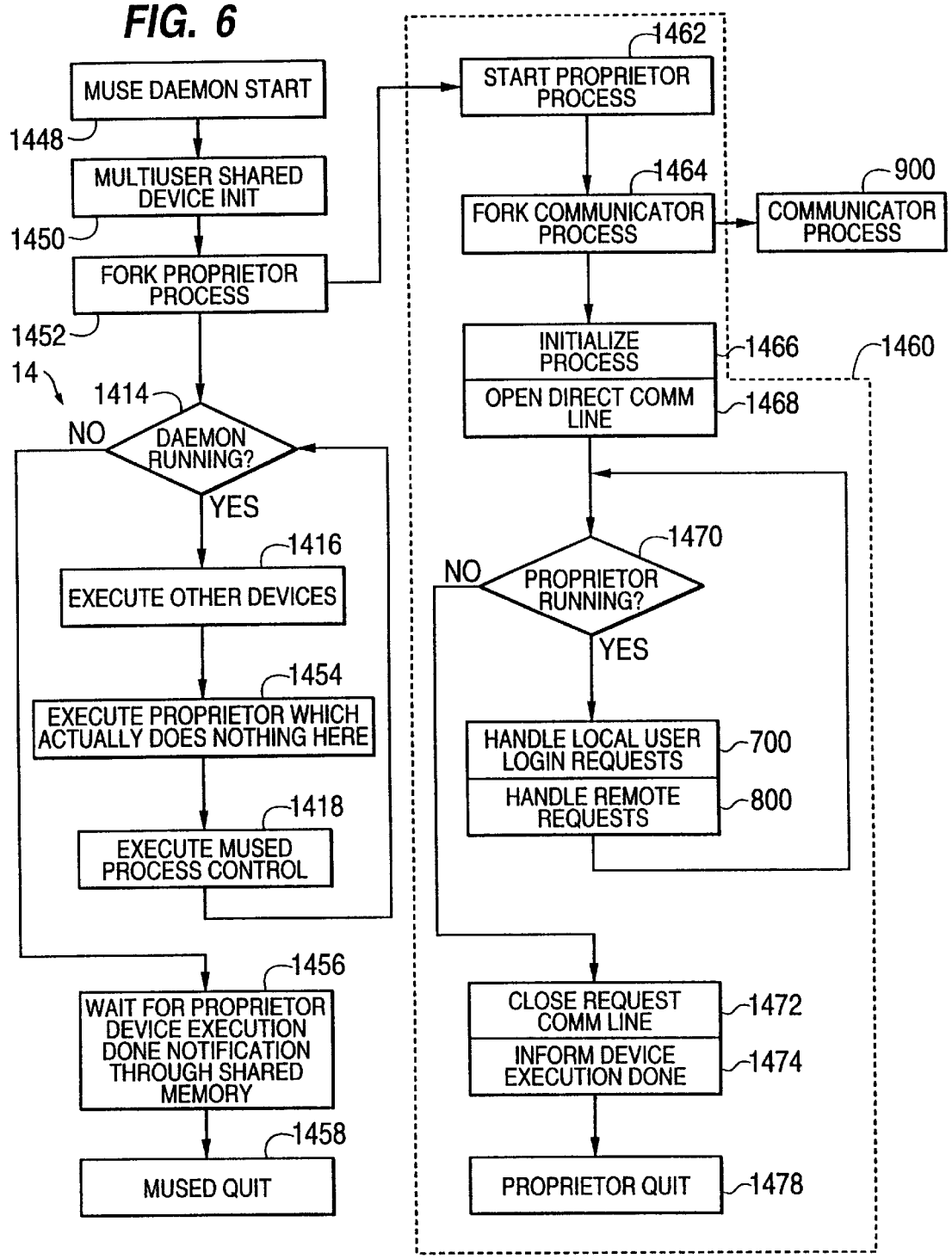
FIG. 6 is a flow chart illustrates an improve MUSE daemon including the proprietor 1460 facilitating communication according to the teachings of the present application.

FIG. 6 is another embodiment of the MUSE daemon of FIG. 5, which embodiment includes the shared multi-user interface features of the present application. In FIG. 6, like steps to that of FIG. 5 are shown by like numerals.

Figure 9:
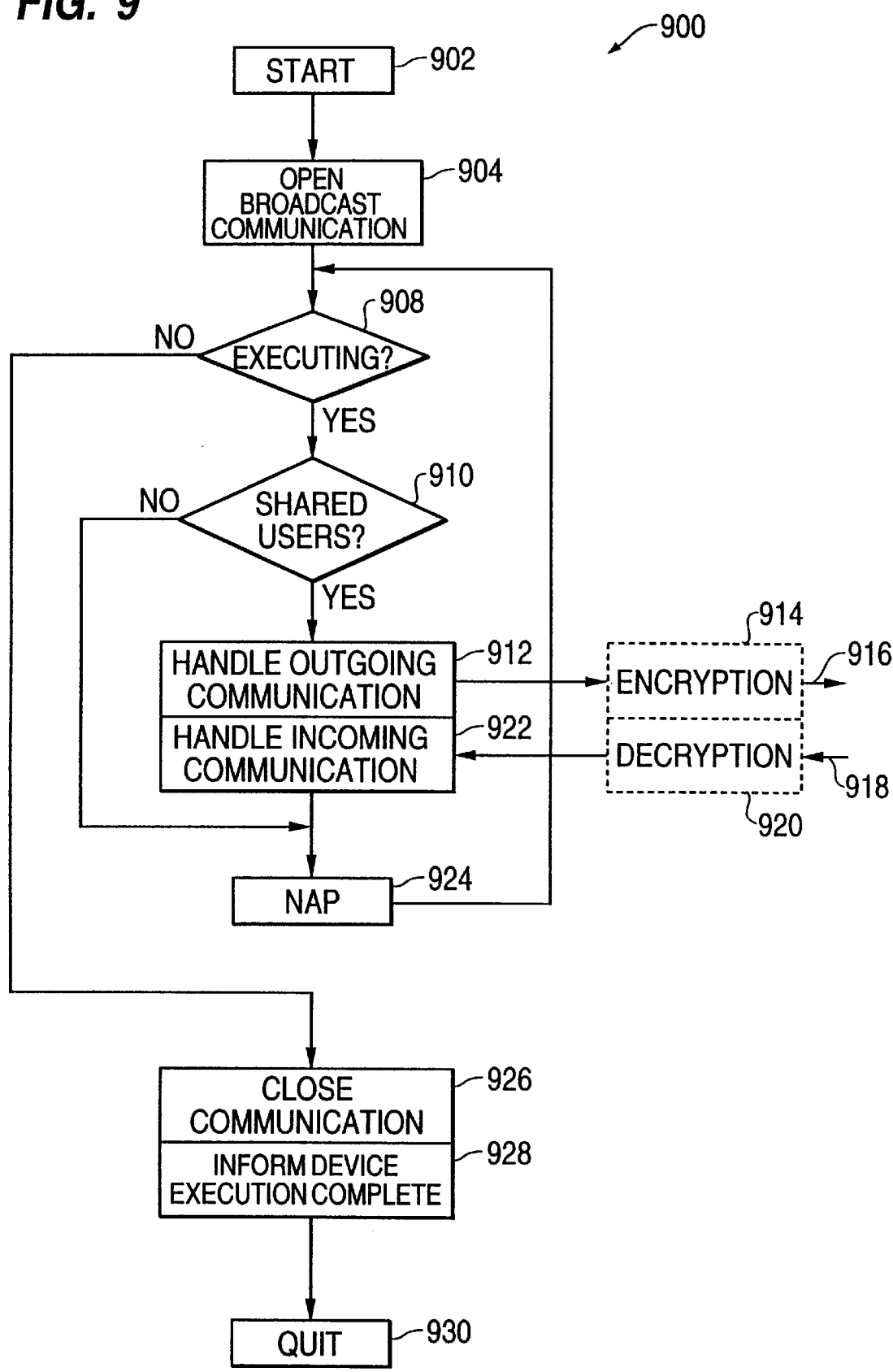
FIG. 9 is a flow chart of the communicator 900 of FIG. 6.

In FIG. 6, the left hand column of steps generally corresponds to FIG. 5, the center column of steps, surrounded by the dashed line, correspond to the communication proprietor 1460 and step 900 on the right side of the figure corresponds to the communicator of FIG. 9.

Figure 7:
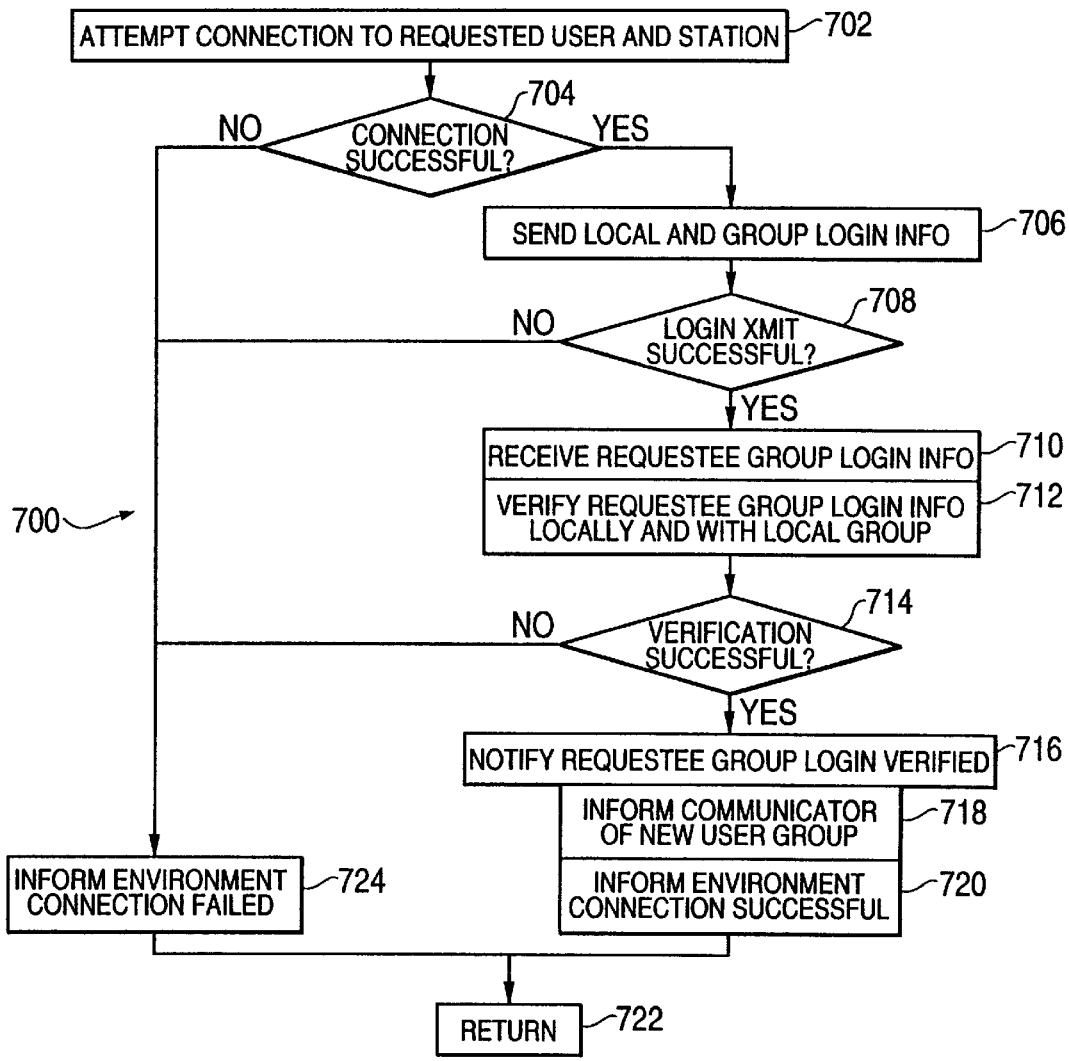
FIG. 7 is a flow chart illustrating the local user log-in request instigator 700 of FIG. 6.
Figure 8:
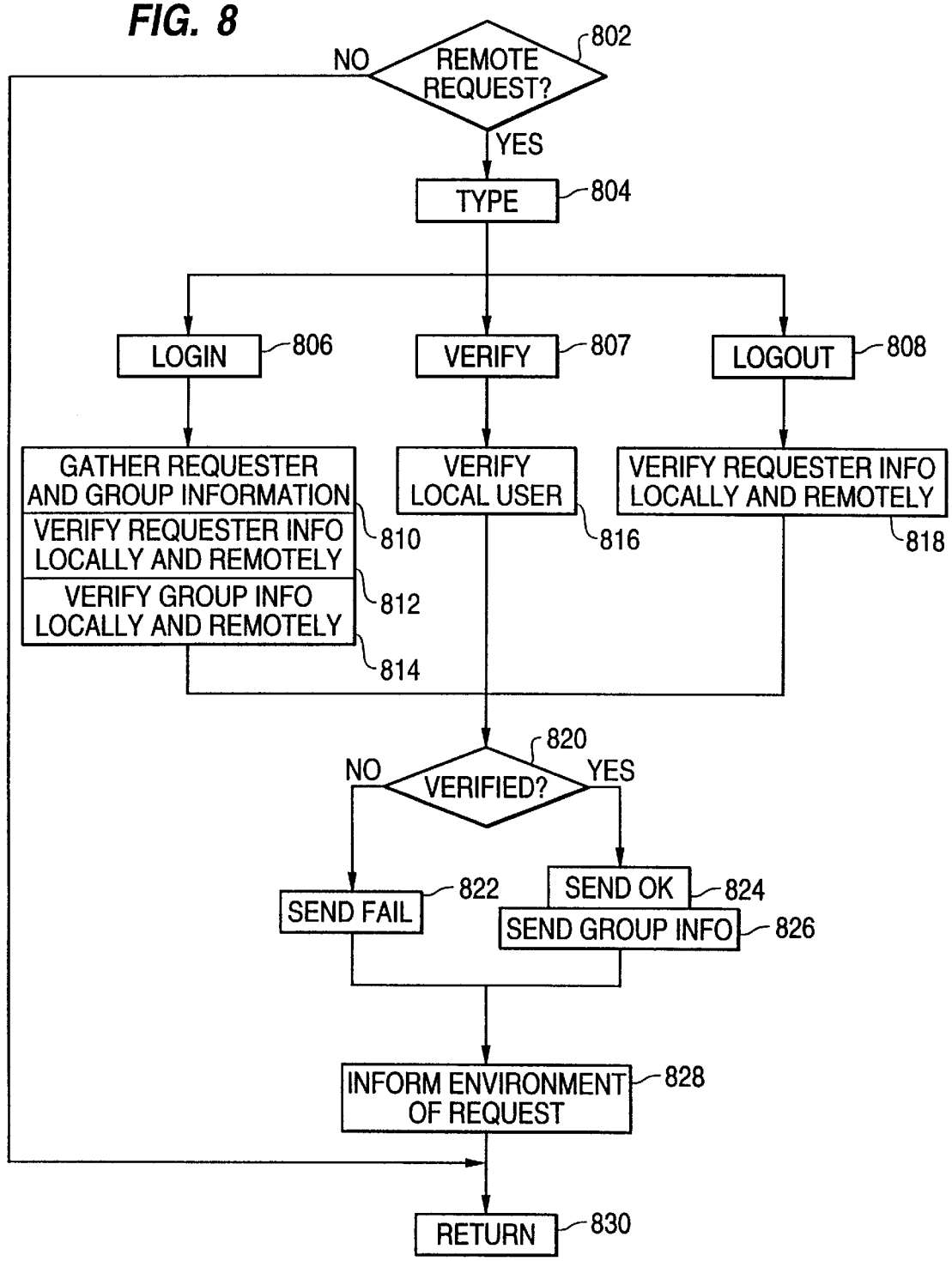
FIG. 8 is a flow chart illustrating the remote request handler 800 of FIG. 6.

FIGS. 7 and 8 of the present application describe steps 700 and 800 of the proprietor 1460 is greater detail. In addition to receiving an indication of whether log-in is okay or failed, step 710 also receives authorized user file information for each user logged in to the requestee's group, with the requestee being the remote MUSE system 10A, 10B that the local MUSE system 10 is requesting sharing with. Thus, at step 710, if the remote user requested is logged in to a group containing two other users, the authorized user file information 744 for each of those remote users is transmitted back to the local MUSE system 10 at step 710.

At step 712, the received requestee group log information is compared with the local authorized user file 744 to ensure that each MUSE system within the remote group is in the local authorized user file 744. The received requestee group logged information also contains a verification that each member of the requestee group has approved the log-in with all members of the local group. Step 714 determines if this verification has been successful. If any one requestee or any one local user refuses to accept the proposed new group, the group is determined at step 714 to be unsuccessful. The local MUSE system is then notified of which user of the proposed group was "black balled" and why so that alternative arrangements may be made.

The MUSE daemon program of FIG. 6 is started at step 1448 which corresponds to steps 1402, 1404, 1406, 1408, 1410 and 1412 of the Daemon 14 flow chart of FIG. 5. At step 1450, the multi-user shared interface device is initialized. Initialization includes opening communication, initializing control states or parameters of devices or peripherals as well as the calculation of the initial values employed by the interface devices. The multi-user shared interface device is a software device which performs the multi-user shared environment communication process according to the concepts of the present application. At step 1452, the proprietor process 1460, which forms a part of the multi-user shared interface device of the present application, is forked to while the daemon control 14 continues to function. At step 1414, if the daemon program 14 is running, the daemon program executes devices 400 (the device routines of FIG. 4), other than the multi-user shared interface device at step 1416. As already mentioned, the shared interface device is a software device having a device routine 400 as illustrated in FIG. 4. All such device routines have an execution section 404 which, for the shared interface device, actually does nothing. However, since all device routines must execute, at step 1454 the shared interface device or proprietor steps through the execution section 404 which does nothing, but allows the MUSE daemon to later perform the device finish section 406.

At step 1418, the MUSE daemon process control is executed and step 1414 determines if the daemon 14 is running. Assuming that it is determined that a daemon 14 is running, as determined at step 1414, steps 1416, 1454 and 1418 are then performed. When a request to quit is received from the local user, the daemon 14 waits for the proprietor device 1460 to complete execution at step 1456 as determined by notification received through the shared memory 12. At step 1458, the MUSE daemon 14 is turned off, performing the functions of steps 1420, 1422, and 1424 of the FIG. 5.

As already explained, the proprietor process 1460 is forked to at step 1452. The proprietor 1460 is responsible for establishing log-in security and instructing a process forked therefrom and called the communicator 900. The communicator 900 (described with respect to FIG. 9) is responsible for accessing shared user state and parameter information (of FIG. 10) in local shared memory 12 and encrypting outgoing shared information, as well as decrypting and storing shared information in the shared memory 12 of the multi-dimensional synthetic environment system 10. After the proprietor process 1460 is forked to at step 1452, the daemon 14 simply performs inline placeholder processes, but does nothing otherwise for communication since the proprietor 1460 and communicator 900 are separate programs. It should be noted that the shared memory 12 of the MUSE system is accessible by both the proprietor 1460 and communicator 900 as well as the MUSE daemon. The shared memory 12 contains a table containing information for each user in the shared environment so that the current state of each individual at each separate station is known by every user connected in the shared environment.

Directing attention now to the proprietor process 1460, the proprietor process is begun at step 1462. The proprietor 1460 in the preferred embodiment uses a token-value based protocol when the token type defines the agreed upon fields of the values. At step 1464, the proprietor process forks the communication process accessing communicator 900. The proprietor process 1460 is first initialized at step 1466, and the direct communication line is opened at step 1468. At step 1470 it is determined whether the proprietor 1460 is running. So long is the proprietor is running as determined in step 1470 (not quit command is received) the proprietor goes on to handle local user log-in requests at step 700, which is described in greater detail in FIG. 7 and to also handle remote site connection requests at step 800 as is described in greater detail in FIG. 8.

Once it is determined that the proprietor is no longer running at step 1470, the program goes to step 1472 and the proprietor logs out of the shared environment, closing the requested communication line at step 1472 and informing the daemon 14 that execution of the proprietor 1460 is complete.

The responsibilities of the local proprietor 1460 include handling the local users request for establishing communication with other MUSE systems 10A, 10B, 10N as well as verifying and answering log-in requests from other MUSE environments 10A, 10B. These functions performed at step 700 will be better understood with reference to FIG. 7 which is a subroutine handling local user log-in requests. A local user's request to log-into another MUSE environment is handled by the process of FIG. 7. This process is referred to as the log-in instigator 700.

As shown in FIG. 11, Each MUSE system 10 keeps an authorized user file 744 stored in memory. This authorized user file 744 stores information related to each user identifying the local user as a possible participant in the shared environment. In accordance with the teachings of the present application, the user 750, PCP/IP port protocol number 752, and host computer identification 754 are recorded for each potential user authorized to access the shared environment. If there are 50 possible users, each local machine in the shared multi-user environment has each user's information stored therein (50 data records). Optionally, a password 756 may be included which the user must enter before logging on to the system as part of a shared group. Such a password may be an encryption key for public or non-public data exchanged between MUSE systems 10, 10A, 10B, and 10N.

When a local user makes a request to log-in to another "remote" environment, the log-in instigator 700 of FIG. 7 is enabled. At step 702, the log-in instigator requests the communicator to attempt to connect to the requested user and station selected by the local user and identified by the correct authorized user entry 744 of FIG. 11. At step 704, it is determined whether the remote MUSE system of the local user can be accessed or connected to. If the answer to this question is no, the proprietor 1460 is informed that connection has failed at step 724. However, if the connection is successful, the local MUSE system 10 is advised and group log-in information is read from the authorized user file 744 of the local system and forwarded to the remote MUSE systems 10A, 10B, 10N at step 706. This includes the authorized user file 744 for each user within the group to which the local user is currently subscribed. Thus, if the local user is presently logged on to a group with two other users, each of the three user's user ID 750, TCP/IP port protocol number 752 and host identification 754 is transmitted to the remote MUSE systems 10A, 10B, and 10N.

At step 708, it is determined whether this transmission of login information is successful. If this transmission of information is not successful, the proprietor is informed that communication has failed at step 724. The proprietor then waits for either a log-in okay or a log-in failed message from the remote MUSE system (e.g. 10A). This is part of the requested group log-in information received at step 710.

If the remote user is currently part of a group with three other users, all four users' user information 750, TCP/IP port protocol number 752 and host identification 754 are transmitted back to the local station at step 710. The local station, at step 712, determines if this information is within the local authorized file 744. If all remote users are identified as proper users locally and if all local users agree that the other users in the other shared environment, then the communicator 900 in the local MUSE system 10 is informed of the new additions to the environment.

After the local communicator is informed of the new additions at step 712 and transmissions of all information including local user state and parameter information is verified as successful at step 714, the remote group is notified that group log-in has been verified locally at step 716. In order to verify all requestees in step 712, the instigator 700 of local MUSE system 10 then sends a package of information of all proposed new members of the group to all local users as well as a verification request to the first member on the locally shared group. The first member on the list must verify the whole group is acceptable and if it is okay, send the package onto the next number on the list after removing its own identification from the local group list. As soon as there is no list lift, an okay is returned to the verification requestor at step 712. If every user both locally and remotely indicate that the combined group is okay, all requestees will be notified of approval of the new group. Thus, at step 716, the group log-in is verified and at step 718 and 720 the communicator of FIG. 9 and the local multi-dimensional synthetic environment system 10 are advised of the new user group and the successful connection thereto.

Each time the user group is changed, the process is repeated. It is clear from this process that, each time an addition to the user group is requested, each user must agree to all participants before log-in is approved. This is a security feature of the system of the present invention, which allows each user to ensure that any proprietary information is being seen only by authorized individuals.

FIG. 8 of the present application describes in greater detail the process, implemented at the local station, of handling remote requests. At step 802 of the process of FIG. 8, the remote request handler 800 determines if a request for a new group has been received from a remote MUSE system 10A, 10B, 10N. If a request has not been received, the remote request handler of the local MUSE system 10 returns to the proprietor 1460 at step 830. If a request has been received as determined at step 802, the remote request handler 800 next determines the type of request. There are three basic types of requests—log-in requests 806, requests for verification 807, and log-out requests 808.

If step 804 determines that the request is a log-in request, the left (log-in) branch 806 of FIG. 8 is selected. At step 810, the log-in branch gathers requester (the remote user requesting log-in) and group information at step 810 and at step 812 determines whether the requestor and group information are correct by comparing it to the local authorized user file 744 such as that illustrated in FIG. 11 to determine that each of the requestors is authorized to operate with the local MUSE system 10. Assuming that step 812 determines that the requestor is authorized, based on the look-up table, each individual remote MUSE system 10A, 10B, 10N in the requester group is also compared to the local authorized user file 744, to verify authorization locally in the same fashion. As part of the verification process of steps 812 and 813, each requestee member of the proposed group must approve all of the members of the new group. Thus, the list of proposed requestor members is circulated to each requestee who approves in turn each member of the new group. Once it is determined that the group members are all authorized members, the log-in process 806 also dials up the location of the requestor to determine that the requestor is who they say they are, in step 812. Similarly, this step is also performed for each proposed group member at step 814.

The center or verify branch 807 of FIG. 8 responds to a remote request from a remote station, which dials up to determine that the local station is actually the user requesting access to the shared multi-user environment. Thus, when the local station is requesting the new group, in step 816, the remote station accesses the local station and asks the local station to verify that they have requested access to the shared multi-user environment or group.

The right column is the log-out branch 808 and simply verifies that each requestor requesting log-out is authorized to do so, so that an unauthorized access will not log an authorized user off the system. Thus, at step 818, the log-out requestor is verified both locally and remotely by looking up the information of FIG. 13 in the local multi-user synthetic environment 10, and by also polling this address remote station to verify that this location has requested log-out.

Once verification has been satisfactorily performed as determined by step 820, the proprietor remote request handler 800 sends an okay both to remainder of the multi-dimensional shared environment 10, and to the remote requestor at step 824. The remote requestor is further provided group information, corresponding to the information of FIG. 13 for each group member at step 826. If verification does not occur as determined in step 820, a fail message is sent both to the local multi-dimensional synthetic environment 10 and to the remote requestor MUSE system such as 10A, 10B, and 10N at step 822.

At step 828, the local multi-dimensional synthetic environment or system 10 is informed of the approved remote request. The subroutine of FIG. 8 returns to the proprietor 1460 of FIG. 6 at step 830.

The Multi-User Shared Interface Communicator

As already explained, the MUSE daemon 14 of FIG. 6 forks at step 1404 to call a communication routine 900 which runs asynchronously and in parallel to the proprietor 1460. The communicator 900 is responsible for the bulk of communication between shared environments and is also responsible for all necessary security or encryption for the shared environment. The communicator in one preferred embodiment of the present application may send information to remote MUSE systems 10A–10N in two basic ways. Most information (in particular, state and parameter information) is transmitted to all remote MUSE systems and therefore broadcast a multicast communication is performed for this purpose. However, some of the communication in the MUSE system is transmitted to less than all remote MUSE systems. In such a circumstance, the communicator 900 sends such information to each specific remote MUSE system (e.g., 10B) by use of TCP/IP transmission to the TCP/IP port protocol number of the desired remote MUSE system. The communicator 900 begins at step 902 and at step 904 opens the agreed upon broadcast communication port. Within the contemplation of the present application, this port may be any suitable digital information communication channel such as an intranet or dedicated telephone lines, and may even be based on internet communication. Particulars of this communication can, as necessary, be stored with the authorized user file 744.

the communicator 900 then waits for the proprietor to inform it that there are shared environments 10A, 10B, 10N to communicate with. Thus, the proprietor 1460 verifies that communication is proper and authorizes the communicator 900 to continue. While there are other MUSE systems 10A, 10B, 10N to communicate within the shared environment, the communicator 900 accesses local control state and parameter information and communicates this information out to remote MUSE systems 10A, 10B, 10N.

As will be described in greater detail with regard to FIG. 10, the multi-user, shared environment operates by storing state and parameter information for each local and remote station at each station, so that each station knows the current state of each other station. At step 908, the communicator determines whether it is executing its communication function to facilitate operation of plural MUSE systems 10 based upon the information provided by the proprietor 1460. At step 910, the communicator determines whether there are verified shared users. Once verification of the presence of shared users is provided by the proprietor 1460, the MUSE communicator goes on to handle communication between those shared users such as remote MUSE systems 10A, 10B, 10N of FIG. 2. At step 912, the communicator 900 handles outgoing communication, which, according to the degree of security needed may optionally be encrypted by an encrypting step 914, for forwarding to the outgoing communication channel 916. The communicator 900 additionally receives information on incoming communication channel 918, which may be optionally decrypted, as necessary, by the decryption step 920, and the incoming communication is handled by the communicator 900 at step 922. If there are no verified shared users as determined in step 910, the communicator idles until shared users are ascertained.

Since the communicator does not need to operate continuously, periodically the communicator is allowed to nap at step 924, to decrease the communicator's processing lead on the multi-dimensional synthetic environment system 10.

If that communicator 900 determines that the system is not executing a shared environment, communication is closed at step 926 and the MUSE daemon 14 is informed at step 928 that the communicator device execution is complete. The communicator routine then quits operation at step 930.

The outgoing communication 912 transmitted by the outgoing communication handler 912, incoming and communication received by the incoming communication handler 922 are prefaced by a unique identifier so the local and remote environments can verify that the information comes from a valid source. This information is compared to the authorized user file 744 information stored in memory as illustrated in FIG. 11. The communication by the outgoing communications handler 912 and incoming communications handler 922 preferably utilizes broadcast socket protocols to share the bulk of the information with other MUSE systems 10A, 10B, 10N. The internal packet protocol is variable in length and is based on token value fields define by a token type. Some token types contain specific links of the fields and some of the information shared is application specific and need not readily understand by the MUSE systems 10A, 10B, 10N being used only to control the MUSE application 18.

In order to ensure efficient communication over a channel which may have a relatively limited bandwidth, the MUSE communicator 900 transmits state values and parameter information only when the state values and parameter information are changed in value by the MUSE application 18 or the remainder of the MUSE system 10. Each time such information is changed, it is sent to each of the shared environments. Desirably, in order to periodically verify synchronization, the contents of the shared user state table and shared user parameter table for each local and remote system are retransmitted.

Shared User State and Parameter Tables

FIG. 10 illustrates hardware modifications to the multi-dimensional synthetic environment system 10 of FIG. 1 occasioned by the multi-user, shared communication in accordance with the present application. As in the multi-dimensional synthetic environment system of FIG. 1, a user 30 interacts with the MUSE application 18 and the remainder of the multi-dimensional synthetic environment system 10 through an application user control 116 which generally corresponds to the interactive devices 22 of FIG. 1. An application user interface 118 generally corresponds to the MUSE daemon 14, shared memory 12, and MUSE functionality 16 of FIG. 1 and supplies necessary information to the application state table 120 and application parameter table 122 which form a part of the shared memory 12 in the MUSE system 10.

The multi-dimensional synthetic environment system 10 of FIG. 1 also contains an application user interface 116 for developing application control state and related information for the local system 10. The application user interface allows the user to set, in shared memory, the application control structure (the application state table 120 and the application parameter table 122) to control the local application in the desired fashion.

The user can selectively control the fields of the application control structure as defined in the application state table 120 and the application parameter table 122, as desired via application user control 116 and application user interface 118.

The application state table and application parameter table information 120, 122 of the shared memory 12 is then used by the MUSE application 18, MUSE functionality 16, and MUSE daemon 14 to produce application state responses at step 124 to facilitate the presentation of application information to the user as represented by block 140, and a shared user representation as represented by block 150. Blocks 140 and 150 represent information supplied to the user 30 by the multi-dimensional synthetic environment system 10. Although this portion of FIG. 10 is arranged differently from FIG. 1, the structure of this portion of FIG. 10 is generally similar to that of FIG. 1 of the present application.

FIG. 10 also discloses the shared user memory 100 including a shared user 1 state table 102, shared user 1 parameter table 104, which in one embodiment monitor the states and parameters of the local MUSE system 10 of FIG. 2, a shared user 2 state table 106 and shared user parameter table 112 for a remote MUSE system N 10N of FIG. 2. It should be apparent that each user of a multiuser group will have a state memory and parameter memory associated therewith in the local MUSE system 10. In the preferred embodiment, the shared user memory 100 forms a part of the MUSE shared memory 12.

Synchronization in a Multiuser Shared Environment

The proprietor 1460 allows the user to request synchronization of various levels up to complete synchronization with a specific remote environment. This is accomplished within both the local and remote MUSE systems by manipulating entries in a shared control table 114 which is also provided as part of the MUSE shared memory 12 in the preferred embodiment. The shared control table 114 reflects the shared user control functionality as presently defined by the local MUSE system 10.

For example, a local user may select a desired level of synchronization with one or more specific remote MUSE systems, e.g., 10A, 10B by mapping of the control state in the shared control table 114. The local user may also desynchronize to a lower level of synchronization as desired. The local user controls the local environment totally, by requesting remote and local control of the environment as desired. Thus, once the local user is part of a shared group, the local user may allow anyone within the shared group to control one or more aspects of user control functionality, as desired by the local user.

The shared user memory 100 including the application control state and mapping tables is used by the application as a mapping mechanism for control information. The user 30 controls the content of the application of the shared control table 114 based upon the desired level of synchronization with remote users. The local multi-dimensional synthetic environment system 10 than uses the shared control table 114 to control the flow of information from the proper functional area of the shared user memory 100 to the local MUSE system 10. The shared control table 114 decides which user is controlling or synchronizing a given item of the synthetic environment, as specified by the information stored in the shared user memory 100. Thus, for example, if the local user 30 would like the perspective of the shared user 2, the local user requests shared user 2 control of the point of view, and the shared control table 114 provides the information defining this point of view to the application state table and application parameter table 120, 122.

Each user of the multi-user, shared environment in accordance with the present application, has a unique representation in the shared environment. Each user is defined as an object within the MUSE environment which allows default functionality embedded within the multi-dimensional synthetic environment system 10 to operate on each user's representation. The representation of any of the shared users may be selected or identified in this matter. For example, the local user may tether is own view to that of any remote user so that the remote users tows the local user around the environment. The user's representation may be magnified, non-linearly enhanced in size, or otherwise modified to render it more visible, or for other purposes.

The representation of each local or remote user is defined as an object within the MUSE environment. In one aspect of the teachings of the present application, the state values associated with each user representation or object may be dependent upon the content of the shared control table. For example of the degree of synchronization of each remote user to the local user can be indicated by a visual modification of the user's representation. In one preferred embodiment, when another user is not fully synchronized with the local user's view of the application data, that remote user is displayed in translucent form. In contrast, when full synchronization between that remote user and the local user is solid form. It should be apparent, however, that by altering the state table entries associated with the user's representation (an object) the system may be modified to enable display of dependents of one data object on another.

The flexibility in allowing the local user to access system functionality and associate with any shared user's representation in the synthetic environment simplifies both the programming of the system of the present application and also allows points of view not readily allowed otherwise. For example, the "tether" command present in the multi-dimensional synthetic environment may be used to tether any user to any object including an other user. Using this command as an example, one user can examine the inside of a cam groove. That user does not have the perspective to navigate the correct direction along the cam groove. However, a second user tethered to the first user may direct the first user by giving instructions such as "take the right path" and is dragged along with the first user by the tether. Thus, two users can interactively examine the data in a way neither could accomplish individually. This is illustrated in the video drawing attached hereto, FIG. 12V.

In the system of FIG. 10, the application state table 120 and parameter tables 122 representative of the data currently being examined by the user 30 may be transmitted to the other networks in the group via communicator 900 and the computer network 34. At the same time, shared user state and parameter information is provided to the local multi-dimensional synthetic environment by the communicator 900, where the state and parameter information representative of the images viewed at each remote MUSE system 10N are stored in the shared user memory 100 at the location of the respective user (for example 110, 112). The user then selects which of this information to display and stores the selection in the shared control table 114, updating the application state table 120 and the application parameter table 122, which updates are transmitted to the other networks by the communicator 900 over the network 34.

The various functionality of each synthetic environment application can be logically separated and control of each logical aspect of this functionality may be controlled by a selective local or remote user. Examples of such a logical separation can be the user viewing position, the time in the application scenario being presented, the current scale of the model, the application state including the functionality or information presently being executed within the application, or any aspect of the synthetic environment. The shared control table 114 defines which user controls which functionality and correspondingly identifies the user in control of that functionality. In this manner, the local user can allow full to very loosely synchronized viewing of the application, with one or more remote users. For example, the local user could synchronize time to one user in the group, allow another user in the group to control lighting of the image data and control user point of view and position locally.

It is important to understand that the local user can recover control of any part or the whole application at any time, upon request. This is accomplished by providing new information to the shared control table 114, defining the local user as being in control of all functionality.

The shared control table 114 can control virtually any aspect of the synthetic environment imageing. For example, the shared control table 114 can control user position, application scenario time, application environment scale, application magnification factor, user field of view, lighting control, the generation of teleportion markers, application object size and placement, or any other application state.

The example illustrated in Table 1 set forth below allows user XYZ to control time, user YRT to control field of view, the application state set to be controlled by user PLV, and allows the local user to control the rest of the example entries. Any number of application controls could be added to the table by distributing a new information type or attribute through the communicator and allowing storage of this information type or attribute at each shared user's multi-dimensional synthetic environment system in the shared user memory 100. Each user could then relinquish control of this new control entry to another user, as desired, to accomplish the desired degree of synchronization.

TABLE 1

Example Shared Control Table

| Entry | Name | Port | Host |
|---|---|---|---|
| user position | local user | | |
| time | xyz | 8050 | machine.domain.net |
| field of view | yrt | 8062 | 111.204.53.2 |
| scale | local user | | |
| lighting | local user | | |
| teleportation | local user | | |
| object | local user | | |
| app state | plv | 8049 | alpha.someplace.com |

The shared control table 114 desirably has software associated therewith to prevent conflicts in synchronization assignment. Such software would monitor the content of the shared control table 114 of each local and remote system and the local users proposed changes thereto. Thus, the user could not assign synchronization of a selected parameter in the local MUSE system's shared control table to remote MUSE system 1, 10A when the remote MUSE system 1, 10A has already assigned control to the local MUSE system. This software prevents such conflicts in assignment no matter how long the loop causing the assignment; for example, local MUSE system 10 →remote MUSE system 1, 10A→Remote MUSE system 2, 10B→Remote MUSE System N, 10N→Local MUSE system 10. Otherwise, such conflicts could not readily be resolved.

The Use of The Override Table

Transmission of certain aspects of the local MUSE data viewed at the local MUSE environment may be inhibited as needed to protect locally private information. Private information may include speech, writing, drawings, pictures, sound, or any other form of communication medium. The proprietor function of communication can also be used to establish a short point to point contact between the local station and the desired shared user to accomplish private communication.

The system of the present application may also allow the local user to generate or display additional information perceivable only by the local user. The data may come from any source, but is intended to be viewed only by the local user.

Both selective private communication, and private space viewing are supported by the use of the override table 130. The override table is a table that matches the entries in the shared control table. Instead of keeping track of who is in control of what functionality, the override table 130 decides what should or should not be shared and inhibits supply of private features to the MSE communicator 900. Thus, only a subset of the functionality within the general application control state and parameter tables 120, 122 passes through the override table to remote MUSE systems 10A, 10B via the communicator 900. The override table 130 also inhibits the storing of this information in the shared user memory 100.

An example of an override table is illustrated in Table 2 to the present opinion.

TABLE 2

Communicator Override Table

| Entry | Override Flag |
| --- | --- |
| user position | share |
| time | share |
| field of view | share |
| scale | share |
| lighting | share |
| teleportation | share |
| object | share |
| app state | share |

In this example, no overrides have been set so that all local application control information is shared within the connected shared user group. However, it is clear that any of the elements listed in Table 2 may be inhibited by the setting of an override flag which prevents this information from being transmitted from the application state table and application parameter table 120, 122 to the remote multi-dimensional synthetic environment systems 10A, 10B of the shared group.

While the override table shown in Table 2 above merely allows transmission or inhibition of application state and parameter information 120, 122 from the local MUSE system 10 to all of the remote MUSE systems 10A—10A in the shared environment via multicast communication, each state or parameter may also have a override table entry associated with each user of the multiuser shared environment. Thus, information relating to the state of a particular object may be transmitted to some of the remote MUSE systems, for example, 10A, 10B but an override flag may be set to prevent transmission of this information only to remote MUSE system N, 10N. Thus, selective override may be accomplished as to the transmitter of state and parameter information to all remote MUSE systems within the multiuser group, depending upon the configuration of the override table 130. In such a circumstance, TCP/IP transmission to the selected remote MUSE system is performed.

Summary of The Operation of The Shared Multi-User Communication System for Multi-Dimensional Synthetic Environments of the Present Invention The shared multi-user interface of the present application is primarily intended for use in the sharing of complex data among independent user oriented multi-dimensional synthetic environments. In the basic multi-dimensional synthetic environment system 10, the application is accessed and controlled with standardized device independent functionality through the use of a shared memory 12. This same degree of flexibility is highly desirable in allowing multiple users to explore, navigate, manipulate, and examine the application data. The system of the present application operates by interfacing a local user with several remote users in a shared multi-user group. The local computer accordingly establishes an initial connection via the proprietor 1460. The proprietor 1460 instigates a connection, verifies the authenticity of the connection, answers log-in requests, establishes separate private lines of communication, where necessary, and conducts log-out tasks for the local user, or a group containing the local user.

The communicator 900 performs ongoing communication of control state and parameter information between each of the local and remote users 10, 10A, 10B, 10N of the shared multi-user environment. A shared user memory 100 contains shared user state and parameter information associated with each local and remote user, which information is updated within the shared user memory 100 of each local and remote synthetic environment system 10 whenever a change in the information occurs. Thus, the communicator collects relevant information from each of the other users and places that information in a corresponding state table assigned to that user in the shared user memory 100.

The shared user memory contains a 1 to 1 copy of the shared user state table and parameter table of each local and remote user 10, 10A, 10B in the shared environment. Thus, the state of any user in the shared environment does not have to rebroadcast periodically. As it is updated each time a state or parameter is modified. Similarly, the content of the application state table and the application parameter table 120, 122 representative of the current application state of the local synthetic environment system is broadcast by the communicator to each of the other remote users within the shared multi-user environment, and also to the corresponding shared user state table and shared user parameter table 102, 104 representative of local synthetic environment system state and parameter information.

An override table 130 is provided to selectively inhibit the transmission of application state table 120 and application parameter table 122 information to some or all of the remote shared environment users. Thus, any information within the application state table and the application parameter table may be retained as private data in execution space.

A shared control table 114 is provided in the shared multi-user environment of the present application and enables logical separation of who is controlling what functionality embedded within the system. The local user of each shared multi-dimensional synthetic environment system may select locally which user controls which functionality embedded within the system. Thus, the shared control table can manufacturer all possible combinations of synchronization with any or all members in the connected multi-user group, including the very information being viewed at any instant in time.

The application 18 uses the control state and parameter table information 120, 122 to control execution of the application. Thus, with the system of the present application, multiple users may view the synthetic environment information with varying degrees of synchronization between users within a shared multi-user group, in substantially real time, and with the various degrees of synchronization.

It is further apparent that in the system of the present application, that each proposed new user of a new group must be approved by each other member of the group, before they are added It should be understood that the description presented herein above is exemplary of representative embodiments of the inventions described herein, which inventions are defined solely by the appended claims. It should be understood that the invention described herein may be modified, as would occur to one of ordinary skill in the art based upon the present disclosure.

We claim:

1. A method of interactively communicating in a multi-dimensional environment defined by data shares between plural data interactive computer devices forming an interactive group, said method, at a local data interactive computer device, comprising:

a) providing a stored memory table of the state of attributes of the data currently being examined at each of said plural data interactive computer devices at the local data interactive computer device;

b) examining desired data on the local data interactive computer device; and c) selecting at least one data attribute to be synchronized with a selected remote data interactive computer device within said group;

said step b) examining the desired data on the local data interactive computer device with said at least one data attribute synchronized to the selected remote computer as defined by the stored memory table representative of the state of attributes of the data currently examined at the selected remote data interactive computer device so that said at least one data attribute is controlled at the selected remote data interactive computer device.

2. The method of claim 1 further comprising transmitting local data interactive computer device attributes to all of the plural data interactive computer devices forming the interactive group.

3. The method of claim 2 wherein said step of transmitting is performed only after the local data interactive computer device verifies that all of the data interactive computer devices forming the interactive group are authorized and all have been approved for the group by all group members.

4. The method of claim 5 further comprising the step d) selectively overriding the transmission of selected attributes of data from the local data interactive computer device to the other data interactive computer devices forming the interactive group to maintain the selected attributes private at the local data interactive computer device.

5. The method of claim 1 wherein said step c) can select all data attributes so that the local data interactive computer device examines the desired data in the same way as the selected remote data interactive computer device.

6. The method of claim 5 further comprising transmitting changes in the data attributes of the data currently examined at the local data interactive computer device to all other data interactive computer devices within said group.

7. The method of claim 1 wherein one user displays the one form of data (e.g. seismic data) and another user displays another form of data (e.g. geological surface representations) each correlated to the other so that different users perceives different data related to the environment being examined.

8. The method of claim 1 wherein said data attributes include user position, application scenario time including rate and direction of time progression, application environment scale including changing from logarithmic to linear scaling or linear distance scaling, application magnification factor, user field of view, lighting control, the placement of teleportation markers, the placement of application objects and their states including exploding images, and the application state and type of data to be displayed.

9. The method of claim 1 wherein 3 or more dimensional data being examined is resident at all of the plural data interactive computer devices forming the interactive group.

10. A method of interactively communicating in a multi-dimensional environment defined by data shares between plural data interactive computer devices forming an interactive group, said method, at a local data interactive computer device, comprising:

a) allowing each user to examine desired data on the respective own data interactive computer device, independently;

b) allowing each user to log onto the group;

the system requiring each user of an established group to approve the addition of a new user to the group before the new user may log on to the group.

11. The method of claim 10 wherein the locations and points of view of the members of the interactive group is displayed at the local data interactive computer device.

12. The method of claim 11 wherein the image of each of the other users' location and point of view within the data is displayed by the local data interactive computer device.

13. The method of claim 12 wherein the image of each of the other user's location and point of view within the data identifies whether the other users are viewing data synchronized to that of the local user.

14. The method of claim 13 wherein said other users appear as translucent ghosts if they are not fully synchronized to the first user's view of the data.

15. The method of claim 10 wherein said method allows one existing group to combine with another existing group; said system requiring all of the members of each group to approve the group to group login.

16. A method of interactively communicating in a multi-dimensional environment defined by data shares between plural data interactive computer devices forming an interactive group, said method, at a local data interactive computer device, comprising:

a) providing a stored memory table of the state of attributes of the data currently being examined at each of said plural data interactive computer devices at the local data interactive computer device;

b) examining desired data on the local data interactive computer device;

c) transmitting changes in the data attributes of the data currently examined at the local data interactive computer device to all other data interactive computer devices within said group selecting at least one data attribute to be synchronized with a selected remote data interactive computer device within said group; and d) selectively overriding the transmission of changes in selected attributes of data from the local data interactive computer device to the other data interactive computer devices forming the interactive group to maintain the selected attributes private at the local data interactive computer device.

17. The method of claim 16 further comprising selecting at least one data attribute to be synchronized with a selected remote data interactive computer device within said group;

said step b) examining the desired data on the local data interactive computer device with said at least one data attribute synchronized to the selected remote computer as defined by the stored memory table representative of the state of attributes of the data currently examined at the selected remote data interactive computer device so that said at least one data attribute is controlled at the selected remote data interactive computer device.

18. The method of claim 16 wherein said step of transmitting is performed only after the local data interactive computer device verifies that all of the data interactive computer devices forming the interactive group are authorized and all have been approved for the group by all group members.

19. A system for interactively communicating a multi-dimensional environment defined by data shared between a local and at least one remote data interactive computer device forming an interactive group comprising at each data interactive computer device in the interactive group:

a multi-dimensional environment system for examination and manipulation data;

a local attribute memory for storing attributes of the data being examined and manipulated by the multi-dimensional environment system;

a remote attribute memory, associated with each remote system for storing attributes of the data being examined and manipulated by that remote system;

a communicator transmitting changes in the attributes of the data of the local data interactive computer device to each remote data interactive computer device so that each data interactive computer device in the interactive group has the correct attributes of the data present at each other data interactive computer device to thereby increase the reaction speed of the local data interactive computer device to changes in attributes developed remotely.

20. The system of claim 19 further comprising:

a shared control table of identifying the attribute for the examination and manipulation of the data at the local system to be controlled by to facilitate selective examination and manipulation of data at the local data interactive computer device to one or more attributes of one or more remote data interactive computer devices.

21. The system of claim 19 further comprising:

an override table for selecting attributes which are not to be transmitted to one or more remote data interactive computer devices, said communicator being responsive to the override table to inhibit communication so indicated.

22. A method of interactively communicating in a multi-dimensional environment defined by data shares between plural data interactive computer devices forming an interactive group, said method, at a local data interactive computer device, comprising:

a) providing a stored memory table of the sate of attributes of the data currently being examined at each of said plural data interactive computer devices at the local data interactive computer device;

b) examining desired data on the local data interactive computer device; and c) transmitting changes in the data attributes of the data currently examined at the local data interactive computer device to all other data interactive computer devices within said group selecting at least one data attribute to be synchronized with, a selected remote data interactive computer device within said group;

said step of transmitting being performed only after the local data interactive computer device verifies that all of the data interactive computer devices forming the interactive group are authorized and all computer data interacting devices in the group have been approved for the group by all group embers.

23. A method of interactively communicating in a multi-dimensional environment defined by data shared between plural data interactive computer devices forming an interactive group, said method comprising:

a) providing a stored memory table of the state of attributes of the data currently being examined at each of said plural data interactive computer devices on each said data interactive computer devices in the interactive group;

b) the user of a local said data interactive computer device selectively modifying one or more of said attributes of the data;

c) in response to said b) of modifying, transmitting the attribute modifications to remote said data interactive computer devices in the interactive group so that the current attribute is stored at each data interactive computer device in the interactive group;

the stored memory table of the state of attributes in step a) reducing the need to transmit information between local and remote data interactive computer devices while increasing remote multi-dimensional environment response time to changes in the attributes of the data.

\* \* \* \* \*